March 28, 1972
J. W. CLEARY
3,652,719
TERPOLYMER OF TEREPHTHALIC ACID, AND/OR ITS ALKYL
ESTERS, 1,4-BIS(2-HYDROXYETHOXY)BENZENE AND
PENTAERYTHRITOL USEFUL AS A DYE RECEPTOR
ADDITIVE FOR POLYOLEFIN,
E.G., POLYPROPYLENE
Filed May 25, 1970
2 Sheets-Sheet 1
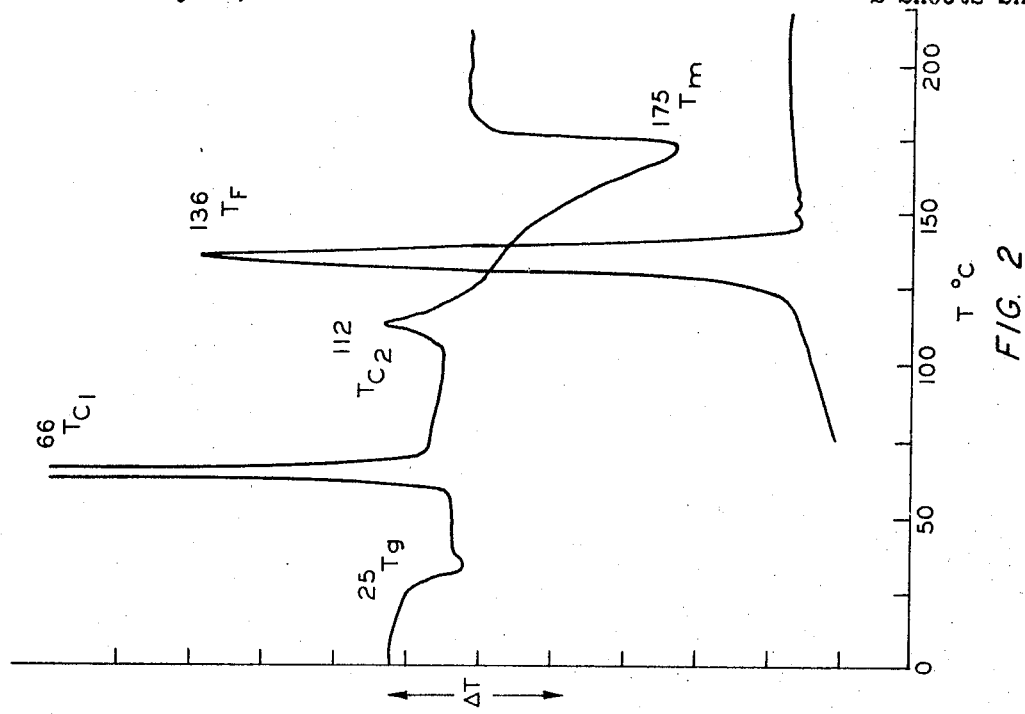
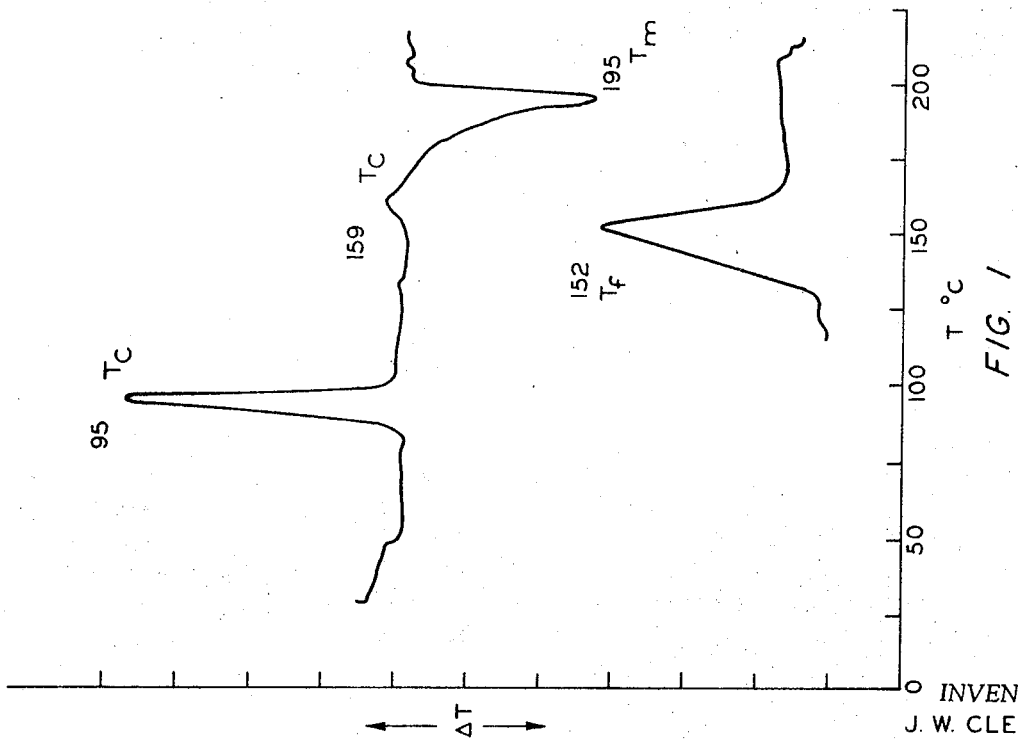
INVENTOR.
J. W. CLEARY
BY
Young & Jen
ATTORNEYS

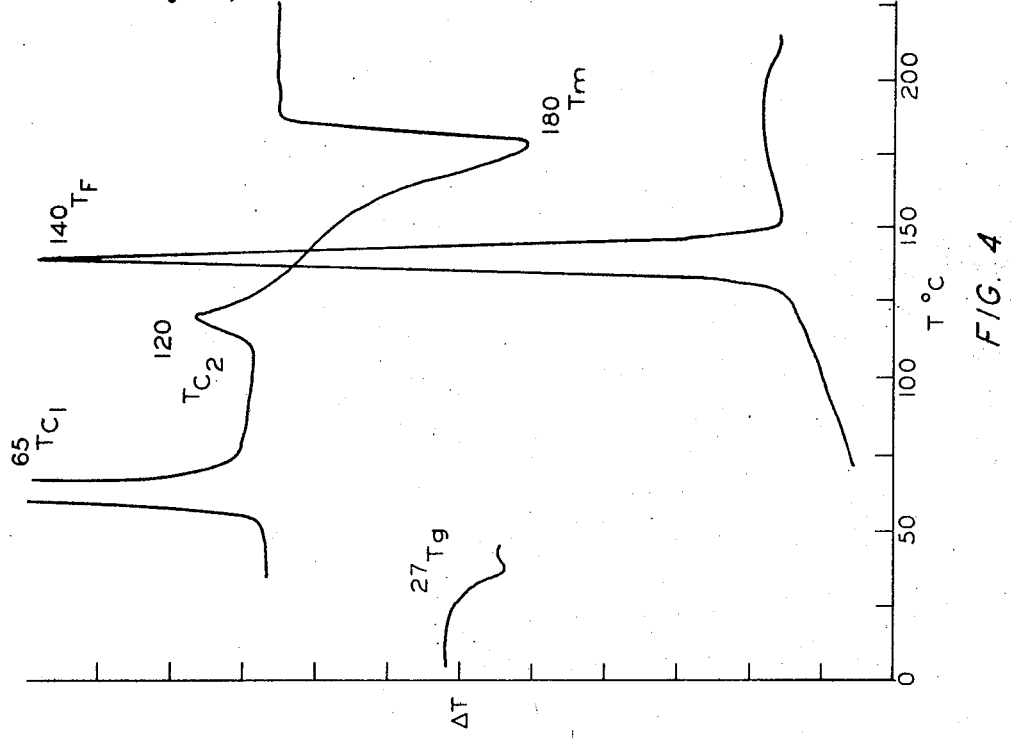
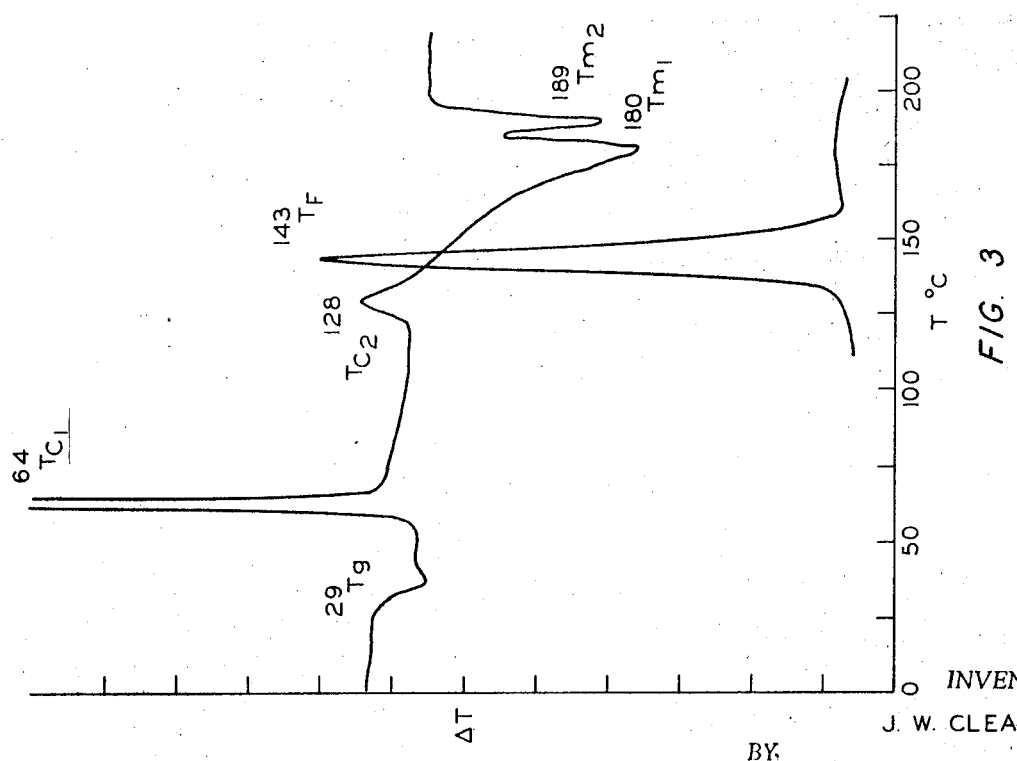

United States Patent Office 3,652,719
Patented Mar. 28, 1972

3,652,719
TERPOLYMER OF TEREPHTHALIC ACID, AND/OR ITS ALKYL ESTERS, 1,4-BIS(2-HYDROXYETHOXY) BENZENE AND PENTAERYTHRITOL USEFUL AS A DYE RECEPTOR ADDITIVE FOR POLYOLEFIN, E.G., POLYPROPYLENE
James W. Cleary, Bartlesville, Okla., assignor to Phillips Petroleum Company
Filed May 25, 1970, Ser. No. 40,280
Int. Cl. C08g 33/10, 39/10
U.S. Cl. 260—873
6 Claims

ABSTRACT OF THE DISCLOSURE

A new polyetherester prepared from terephthalic acid (TPA) or an alkyl ester thereof, the alkyl radical having from 1–4 carbon atoms, 1,4-bis(2-hydroxyethoxy)benzene and minor amounts (less than about 10 mol percent) pentaerythritol, is an effective dye receptor additive for polypropylene, especially for use in fibers.

---

This invention relates to the dyeing of a polyolefin, e.g., polypropylene. It also relates to a new additive for incorporation into the polyolefin to render the same receptive to a dye, for example, to a disperse-type dye.

According to a concept of the invention improved dyeability of a polyolefin, e.g., polypropylene, has been accomplished with use of a new unique terpolymer prepared from terephthalic acid and/or an ester thereof, 1,4-bis(2-hydroxyethoxy)benzene and a minor amount of the order of less than about 10 mol percent of pentaerythritol. According to another concept of the invention a terpolymer prepared as herein described is blended with a polyolefin, e.g., polypropylene, to render the same receptive to dyes in an improved manner.

I have now discovered that the addition of a minor amount of pentaerythritol in the formation of a polyetherester which is prepared from terephthalic acid or ester thereof and 1,4-bis(2-hydroxyethoxy)benzene there can be obtained improved dyeability as shown herein. The dyeability is considered better than obtained using a polyether ester containing no pentaerythritol.

It is an object of this invention to prepare an additive to improve the dye receptivity of a polyolefin.

It is another object of this invention to prepare an additive which when added to a polyolefin improves the dye receptivity of a blend of the terpolymer and the polyolefin. It is another object of this invention to prepare a unique terpolymer or polyetherester suitable for use as a dye-receptor additive. It is a further object of this invention to improve the dyeability characteristics of a polyolefin fiber containing such additives, e.g., polypropylene.

Other aspects, concepts, objects and the several advantages of this invention are apparent from a study of this disclosure, the drawing and the appended claims.

According to the present invention there is prepared a terpolymer of terephthalic acid and/or ester thereof, 1,4-bis(2-hydroxyethoxy)benzene and pentaerythritol. The pentaerythritol is present in the mixture of reactants used in preparation of the polyetherester in a minor or small amount, usually of the order of about 0.001 to about 10 mol percent. The ester of terephthalic acid will usually be and now is preferred to be an alkyl ester having 1–4 carbons in the alkyl radical. Practically the radical chosen must permit removal of the alcohol at an operating temperature which does not exceed, ordinarily, the boiling temperature of the glycol or pentaerythritol.

Also according to the invention the polyetherester is blended with a polyolefin, e.g., polypropylene, to obtain a blend of polypropylene and the polyetherester which is possessed of improved dye-receptive properties when compared to the original polypropylene and also when compared to a blend of polypropylene and a polyetherester containing no pentaerythritol.

EXAMPLE I.—PREPARATION OF TERPOLYMER 198.2 g. (1.00 mol) 1,4-bis(hydroxyethoxy)benzene
166.1 g. (1.00 mol) terephthalic acid
1.361 g. (0.01 mol) (1 mol percent) pentaerythritol were placed into a stirred reactor and heated under autogenous pressure at 540° F. for three hours. The reactor was vented, placed under house vacuum for 30 minutes, then under open pump vacuum for 2½ hours at 540° F. The melt was extruded under about 10 p.s.i. nitrogen onto Dry Ice. The product froze to a brownish glass with opaque center. The melting point determined on a hot plate was ~185° C.

($\eta$) Inherent viscosity at 30° C. (0.5 g. polymer/100 cc. of solvent) in 60% phenol/40% $C_2H_2Cl_4$=0.20

DTA (differential thermal analysis):

|  | ° C. |
|---|---|
| Premelt crystallization | 95 |
| Premelt crystallization | 159 |
| Melting peak | 195 |
| Freezing peak | 152 |

Two additional runs were made with terephthalic acid and with the following respective amounts of pentaerythritol and inherent viscosities obtained as listed.

0.005 mol $\eta$ (0.5 mol percent)=0.15
0.0075 mol $\eta$ (0.75 mol percent)=0.22

EXAMPLE II

|  | G. |
|---|---|
| Dimethyl terephthalate (DMT) (1 mole) | 192 |
| 1,4-bis(hydroxyethoxy)benzene (BHB) (0.90 mole) | 178.4 |
| Pentaerythritol (PE) (0.05 mole) (5 mol percent) | 6.81 |
| Zinc acetate. 2 $H_2O$ (catalyst) | 0.192 |

The mixture of reagents was placed in a 2 liter autoclave reactor equipped with thermometer, stirrer and vacuum line and was heated to 400° F. for two hours, venting methanol; the temperature was raised to 450° F. for 15 minutes, to 500° F. at atmospheric pressure, then at 500° F. under house vacuum (20″) for 15 minutes and under pump vacuum 0.3 mm. Hg for 60 minutes. Then the flask was allowed to return to atmospheric pressure under nitrogen and 1 ml. tris-nonylphenyl phosphite (Polygard) was stirred in to stabilize the polymer. The melt was extruded onto Dry Ice as in Example I and a creamy white solid was recovered.

| Inherent viscosity | 0.09 |
|---|---|

DTA diagram values:

|  | |
|---|---|
| $T_g$ (glass transition), ° C. | 25 |
| $T_{c_1}$ premelt crystallization | 66 |
| $T_{c_2}$ premelt crystallization | 112 |
| $T_m$ melting | 175 |
| $T_f$ freezing | 136 |

EXAMPLE III

A similar run was made using:

|  | G. |
|---|---|
| DMT (1 mole) | 192 |
| BHB (0.96 mole) | 190.3 |
| PE (0.02 mole) (2 mol percent) | 2.72 |
| Zinc acetate.2 $H_2O$ catalyst | 0.192 |

The reaction times under the various pressure conditions given in Example II were 30 minutes at each stage.
A creamy white solid was recovered.

Inherent viscosity _____ 0.11

DTA diagram values ° C.:
- $T_g$ _____ 29
- $T_{c1}$ _____ 64
- $T_{c2}$ _____ 28
- $T_m$ _____ 180
- $T_{m2}$ _____ 189
- $T_f$ _____ 143

EXAMPLE IV

A similar run using:

|  | G. |
|---|---|
| DMT (1 mole) | 192 |
| BHB (0.98) | 194.2 |
| PE (0.01 mol.) (1 mol percent) | 1.36 |
| Zinc acetate.2 $H_2O$ catalyst was made | 0.192 |

The mixture was held at 450° F. for 5 minutes, at 500° F. for 2 hours, at 500° F. under house vacuum for 15 minutes. No stabilizer was added. A light tan solid was recovered.

Inherent viscosity _____ 0.08

DTA values:
- $T_g$ (° C.) _____ 27
- $T_{c1}$ _____ 65
- $T_{c2}$ _____ 120
- $T_m$ _____ 180
- $T_f$ _____ 140

EXAMPLE V.—DYE RECEPTOR TESTS 100 parts by weight polypropylene (Fiber Grade, MF)[1] was blended with 10 parts by weight of the polyetherester prepared with 1.0 mol percent pentaerythritol of Example I in an extruder blender and pelletized. The pellets were melt spun on a ¾ inch spinning machine under the following conditions:

Spin temperature—545° F. (285° C.)
Pack (from bottom)—60 mesh/5–325 mesh/200 mesh/100 mesh/60 mesh
Spinneret—8 hole by 0.030″ by 0.075″
Polymer throughput—2 g./min./hole
Draw ratio—2.5×
Draw temperature—116–143° C.

The yarn had the following properties:

| | |
|---|---|
| Denier/fil | 300/16 |
| Tenacity, g./d. | 2.11 |
| Elongation | 147 |
| 5% modulus | 17.4 |
| Uster percent | 7.0 |
| Boil water shrink | 7.3 |

[1] Polypropylene melt flow (ASTM D 1238-65T) 12; density (ASTM D 1505-63T) 0.905 optical melting point 349° F. (176° C.).

The yarn sample was knitted into a fabric and samples were dyed at the 2 percent level O.W.F. (original weight of fabric) with the dyes listed below and then tested:

| | Color yield $K_s$ | Light fastness [1] | Crock fastness [2] |
|---|---|---|---|
| Calcosyn Yellow GCN [3] | 5.98 | 5/40 | 5 |
| Polydye Red BC [4] | 11.84 | 3/20 | 5 |
| Genacron Blue GR [5] | 7.10 | 4/20 | 4 |

[1] Sample has a light fastness of 5 after 40 hours of exposure and compared to a Blue Wool Standard. On this scale 10 is the maximum/20 hours is the minimum.
[2] This test measures fade resistance. Scale is 0-5 with 5 the top value.
[3] Calcosyn Yellow GCN–1963 Color Index identification as Disperse Yellow 3 (American Cyanamid Co.).
[4] Polydye Red BC—made by ICC—No Color Index listing.
[5] Genacron Blue GR—made by GAF—No Color Index listing.

Standard tests used in determining the fiber and dye properties with results as follow:

Tenacity and elongation—D-885–Test 68 ASTM
5% modulus (secant modulus test; see PP11.9 of D-885)
Uster—ASTM D-1425-67
Boiling water shrinkage—ASTM 2259-688
Crock fastness—AATCC test 8-1961
Light fastness—AATCC 16E-1964T
Color yield measured on an Instruments Development Laboratory Model D-1 Color Eye. Reflectance (r) at the wavelength of maximum absorbence is measured, and the $K/S$ values are equal to $(1-R)^2/2R$. Larger numbers represent better color yield.
AATCC=American Association of Textile Chemists and Colorists.

EXAMPLE VI

| Polymer | Color yield [a] | Light fastness [b] | Crock fastness (dry)/wet | Dry cleaning |
|---|---|---|---|---|
| Polypropylene—without added dye receptor. | [1] 1.3<br>[2] 2.6<br>[3] 3.1 | <2/5<br>2/5<br><2/5 | | 0.[c]<br>0.[c]<br>0.[c] |
| Copolymer of 1,4-bis(2-hydroxyethoxy) benzene and TPA. | [1] 5.29<br>[2] 7.65<br>[3] 6.50 | 5/40<br>3/20<br>3/20 | Not run<br>____do____<br>____do____ | Not run.<br>Do.<br>Do. |
| Terpolymer, as above with 1.0 mol percent pentaerythritol. | [1] 5.98<br>[2] 11.84<br>[3] 7.10 | 5/40<br>3/20<br>4/20 | 5 (highest rating)<br>5<br>4 | 1 to 2.<br>2.<br>2. |

[a] Color yield on deep dyeing (2.0% O.W.F. level) using—
  [1] Calcosyn Yellow—GCN
  [2] Polydye Red—BC
  [3] Genacron Blue—GR
[b] Measured by comparison with a Blue Wool Standard sample-rating 1-8/hrs. with 8 the highest rating. Dry cleaning test very severe not directly applicable to carpet dyed fibers. Rating 1-5, with 5 the highest possible.
[c] Sample was virtually colorless after test.

It is evident from the foregoing example that the color yield on deep dyeing, i.e., at 2 percent (O.W.F.) level, was clearly considerably and importantly improved when the terpolymer was substituted for the copolymer and greatly improved over the unblended polypropylene.

It now appears that the small amount of the pentaerythritol should preferably be of the order 0.001 to about 10 mol percent, the preferred range now being from about 0.1 to about 5 mol percent of pentaerythritol added to the polymerization charge. For certain applications, as can be determined by routine test, the small amount of pentaerythritol added can reach as high as 10 mol percent. It will be understood that the terpolymer must be blended with the polyolefin and thus it must be thermoplastic, i.e. millable and extrudable. This means it must not be crosslinked to a thermoset condition which may occur if the mol percent concentration of pentaerythritol is greatly increased.

The terpolymer which can be prepared according to the invention will differ somewhat in their inherent properties. Usually for purposes of dyeing the polyolefin, a terpolymer having an inherent viscosity determined as herein set out in the approximate range of from 0.05 to about 0.25 can be prepared.

Referring now to the drawings there is shown a differential thermal analysis graphically illustrating the differential thermal analysis given in Examples I, II, III and IV. These differential thermal analyses characterize further the kinds of terpolymer involved in the invention, the numbered figures corresponding to the products obtained in Examples I–IV.

The polyolefins which can be blended with the polyetherester terpolymer and dyed according to the invention are those known in the art and include polymers of ethylene, propylene, 4-methylpentene-1, copolymers using as comonomers ethylene and butene-1, ethylene and hexene-1, propylene and ethylene and other polyolefins especially those which are spinnable into fibers and filaments. For example, the polypropylene may have melt flows (ASTM D 1238–65T) ranging from 3–15, a density (ASTM D 1505–63T) ranging from 0.905–0.920 and an optical melting point from 160–180° C. (320–356° F.).

The polymerization of the three components to prepare the terpolymer of the invention is effected at an elevated temperature sufficient to obtain a desired terpolymer. Usually the temperature during the polymerization will be in the approximate range of from about 200 to about 600° F.

The amount of the terpolymer blended with the polyolefin will usually be in the range of from about 1 to about 25 percent of the polyolefin. Good results have been obtained at levels of from about 5 percent to about 15 percent when dyeing polypropylene with a terpolymer, as set out in Example V hereof.

Reasonable variation and modification are possible within the scope of the foregoing disclosure, the drawing and the appended claims to the invention the essence of which is that a terpolymer consisting essentially of a polyetherester prepared from terephthalic acid, and/or an alkyl ester thereof, 1,4-bis(2-hydroxyethoxy)benzene and a minor amount of pentaerythritol has been prepared and has been found to effectively improve the dyeability of a polyolefin, e.g., a polypropylene fiber containing the same.

I claim:

1. A polyolefin having improved dye-receptive properties which comprises as additive blended together therewith a small amount in the approximate range 1–25 percent of the polyolefin of a terpolymer prepared by polymerizing together at an elevated temperature and under pressure at least one of terephthalic acid and an alkyl ester thereof, and 1,4-bis(2-hydroxyethoxy)benzene and a minor amount of the order of less than about 10 mol percent of pentaerythritol.

2. A blend according to claim 1 wherein the polyolefin is polypropylene.

3. A method for dyeing a polyolefin which comprises blending said polyolefin together with a small amount in the approximate range of 1–25 percent of the polyolefin of a terpolymer prepared by polymerizing together at an elevated temperature and under pressure at least one of terephthalic acid and an alkyl ester thereof, and 1,4-bis(2-hydroxyethoxy)benzene and a minor amount of the order of less than about 10 mol percent of pentaerythritol and then dyeing the blend.

4. A method according to claim 3 wherein the polyolefin is polypropylene.

5. A polyolefin according to claim 1 wherein the polyolefin is in the form of a fiber or filament.

6. A polyolefin according to claim 1 wherein the amount of terpolymer blended together with said polyolefin is in the approximate range of 5–15 percent.

References Cited

UNITED STATES PATENTS

| | | | |
|---|---|---|---|
| 2,437,232 | 3/1948 | Rothrock et al. | 260—75 |
| 3,419,638 | 12/1968 | Fuzek | 260—873 |
| 3,431,322 | 3/1969 | Caldwell et al. | 260—873 |

FOREIGN PATENTS

| | | | |
|---|---|---|---|
| 1,054,303 | 1/1967 | Great Britain | 260—873 |
| 1,194,704 | 6/1970 | Great Britain | 260—873 |

WILLIAM H. SHORT, Primary Examiner

E. WOODBERRY, Assistant Examiner

U.S. Cl. X.R.

8—Digest 9; 260—47 C